United States Patent [19]

Bengtsson et al.

[11] Patent Number: 4,547,380

[45] Date of Patent: Oct. 15, 1985

[54] PROCESS OF PREPARING FROZEN FRUIT OR VEGETABLES

[75] Inventors: Bengt L. Bengtsson, Bjuv, Sweden; Peter Lindberg, Concise, Switzerland

[73] Assignee: Nestec S.A., Vevey, Switzerland

[21] Appl. No.: 556,898

[22] Filed: Dec. 1, 1983

[30] Foreign Application Priority Data

Dec. 23, 1982 [EP] European Pat. Off. ........ 82111953.4

[51] Int. Cl.$^4$ ........................... A23B 7/04; C12H 1/04
[52] U.S. Cl. .................................... 426/302; 426/271; 426/524
[58] Field of Search ............... 426/510, 271, 386, 524, 426/615, 302, 305, 310

[56] References Cited

U.S. PATENT DOCUMENTS

| | | | |
|---|---|---|---|
| 2,948,619 | 8/1960 | Ashley | 426/510 |
| 2,948,620 | 8/1960 | Ashley | 426/510 |
| 2,978,325 | 4/1961 | Ashley | 426/510 |
| 3,734,751 | 5/1973 | Bengtsson et al. | 426/271 |

*Primary Examiner*—George Yeung
*Attorney, Agent, or Firm*—Vogt & O'Donnell

[57] ABSTRACT

To reduce the quantity of waste waters which must be treated in sewage farms most of the waste water which is produced in blanching and cooling stages, is eliminated. The present process comprises treating fruit or vegetables in the conventional manner up until the blanching stage, blanching them in steam and recovering a condensate, cooling them in air and preferably spraying with water or with some of the condensate, or following the air-cooling with a passage in cold water in a cooling cycle. After adding the required quantity of salt to the vegetables for example, they are frozen and their surfaces are glazed with all or some of the condensate. This process also increases the yield the prevents the loss of valuable soluble substances.

8 Claims, No Drawings

PROCESS OF PREPARING FROZEN FRUIT OR VEGETABLES

This invention relates to a process for the preparation of frozen fruit or vegetables, in which the volume of waste waters is reduced.

In the conventional treatment of frozen fruit and vegetables, the fruit or vegetables which have been harvested are washed with water, graded, pared if necessary, blanched in water, cooled in water, their salt or sugar content is adjusted and they are frozen. Blanching is essential because it deactivates enzymes, expels air and reduces the quantity of microorganisms which are present in the starting material. It must be followed by rapid cooling, the purpose of which is to stop heat passing into the flesh and to prevent discolouration. Moreover, cooling in water enables the load on the freezer to be reduced, so that it may be used efficiently. In the traditional process, however, the blanching and cooling stages produce waste waters in an amount of about 40% of the total weight.

According to a process which is described in British Pat. No. 1,405,649, blanching is avoided in the manufacture of canned vegetables in order to preserve their colour without the use of a chemical treatment, by rapidly sterilizing the vegetables at an elevated temperature in a scraped surface heat exchanger and then introducing them aseptically into cans which have been previously sterilized.

Another preservation process which is described in U.S. Pat. No. 2,471,170, recommends blanching in hot water before canning. According to this patent, the blanching water is converted into top-up liquor (brine, sugared water etc.), which is added to the vegetables during canning to retain the water-soluble compounds which have passed into the blanching water. The two processes mentioned above make it possible to reduce the loss of nutrients, taste and aroma, but they relate only to canned foods.

In the case of fruit and vegetables which are to be frozen, blanching and cooling are essential and hitherto little attention has been paid to the loss of valuable water-soluble compounds which pass into the water, or to the pollution of the water which is produced during these stages.

We have found that it is possible to substantially reduce the volume of the waste waters, while recovering the valuable soluble substances and increasing the yield by weight and thus also reducing the pollution.

The process according to the present invention comprises treating fruit or vegetables in the conventional manner up until the blanching stage, and it is characterised in that the fruit or vegetables are blanched in an atmosphere containing steam, a condensate is recovered, the fruit or vegetables are cooled in an essentially gaseous medium, frozen and their surfaces glazed with at least some of the condensate which is produced during blanching.

Any fruit or vegetable which would normally be blanched to ensure its conservation in a frozen state may be treated by the present process. However, the process is particularly adapted to the treatment of pared or whole fruit and vegetables which sustain heavy losses of water-soluble compounds during blanching in water because of their large surface area, such as leaf vegetables, spinach, cabbage, Brussels sprouts, leeks, asparagus; herbs, for example oregano, parsley, rosemary; finely sliced root vegetables, for example carrots, celery, turnips, potatoes, swedes; or because of their high content of compounds which are very soluble in water, such as sugars and flavour compounds, for example apples, onions, maize, pears, peaches and peas. Aubergines, various types of beans, broccoli, cauliflower and various mushrooms can also be mentioned by way of example.

The expression "an atmosphere containing steam" means a gaseous medium containing steam, for example steam, or a mixture of air and steam. The expression "in an essentially gaseous medium" means that at least part of the cooling operation is carried out by means of air. Thus, it is possible to use air alone, or an aerosol may be used which is obtained by spraying a mist of water into a current of air. In one embodiment, the treatment with air may be followed by a residence period in an aqueous medium, for example in troughs.

Blanching may be carried out by heating directly with steam or with a mixture of steam and hot air in any type of steam blanching apparatus having means for recovering the condensate, for example a continuous screw, belt or fluidized bed blanching apparatus. The product may be loose or in the form of a single layer, as in the case of the process known as "rapid individual blanching". Blanching lasts from 1 to 10 minutes at a temperature of from 75° to 120° C. Depending on the efficiency of the blanching apparatus, from 0.11 to 0.50 kilograms of condensate/kg of the treated product may be recovered.

Cooling takes place by circulating cold air over a bed of the product, and is preferably followed by a residence period in an aqueous medium or by finely spraying an aqueous medium in a current of cold air. Rapid cooling reduces the losses caused by evaporation and improves the yield.

According to one embodiment, air is blown over a vibrating bed of food particles which are arranged in a layer of a uniform thickness, and this causes cooling by the evaporation of the water emanating from the hot product. A consecutive cooling stage is preferably provided by residence in an aqueous medium. Outside air is generally used which, in practice, only cools the product to a temperature of from 12° to 30° C., depending on its relative humidity and temperature. However, it is desirable that the product should be cooled to a lower temperature without the use of a freezer. In order to do this, the fruit or vegetables are placed, for example, in a trough filled with water at a temperature of from 0° to 10° C., this being a temperature at which diffusion of the water-soluble compounds into the water is quite low, so that the pollution of the water which is produced thereby is also low. In a preferred embodiment, the water which is used is cooled indirectly in a heat exchanger before it is introduced again into the cooling trough.

In such a cooling cycle, the water is rapidly saturated with soluble compounds and diffusion of these compounds into the water ceases. Thus, the pollution does not increase any further.

According to another embodiment, the products are cooled by pulsed air together with spraying of a cold aqueous medium. Some of the blanching condensate may advantageously be sprayed over the product to compensate for the losses caused by evaporation.

The condensate which leaves the blanching apparatus contains solid matter (fine particles of fruit or vegetables, fragments or vegetable cells, sugars, vitamins, mineral salts or other water-soluble compounds) and it has to be freed from the larger particles which would block the spraying nozzles during the subsequent glazing operation, either by filtration with a filter which has meshes with a diameter smaller than that of the nozzle openings, or by decantation of the condensate, for example, in a centrifuge.

The condensate is preferably concentrated by, for example, evaporation or reverse osmosis, in order to obtain a suitable volume for glazing. The quantity required for glazing i.e. from 1 to 7% by weight of the frozen product is less than the quantity of condensate issuing from the blanching apparatus, which is from 11 to 50% by weight of the starting material which is used. Some of the condensate may then be sprayed over the product in the air cooler and the rest may be concentrated and used for glazing.

In one embodiment, if the food is cooled by air without spraying with condensate, the latter may be concentrated from 2 to 10 times, in order to obtain the exact volume required for glazing.

By using the above-mentioned preferred embodiments, it is possible to almost completely eliminate the pollution which results from the blanching and cooling stages. Moreover, these embodiments encourage the use of blanching apparatus having a low energy consumption, i.e., machines which are well-insulated against heat loss and which have vapour locks at the inlet and outlet, since these blanching machines produce a low volume of condensate which has to be concentrated and treated in the subsequent stages.

If desired, it is possible to adjust the quantity of salt in the vegetables or the sugar content in the case of fruit by, for example, passing vegetables through a trough of brine. After the vegetables have been recovered on a grating, the brine is advantageously recycled. The vegetables are then passed through a trough where they are washed, preferably in counter-current, in order to remove excess salt while being cooled, for example from ambient temperature to a temperature approaching 0° C. This washing operation is preferably carried out as a cooling cycle including a heat exchanger.

After salting and washing, the product may be frozen in any suitable freezing apparatus, for example in a belt-freezing tunnel, a fluidized bed freezer, by a system of immersion into a cryogenic liquid or by a system of spraying a cryogenic liquid.

Glazing may be carried out by spraying the condensate over the frozen product or by immersing the frozen product into the condensate, the condensate representing from 1 to 7% by weight of the finished product. The lower the temperature of the product, the greater the efficiency of the glazing. This operation improves the quality of the product by forming a barrier against dehydration during storage. When the glazing solution consists of unconcentrated condensate, it may be necessary to send some of it to a sewage farm or this part of waste solution may advantageously be used to make up top-up liquor used in canning if the factory also has a production line for preserved products.

In some cases, the recycled cooling-water and the condensate will be treated to remove bitter substances, colourings, nitrates as, for example in the case of spinach, by passing these aqueous media through columns provided with ion exchange resins or with other selective adsorbing agents.

The following Examples illustrate the present invention. In these Examples, the parts are parts by weight, unless otherwise indicated.

EXAMPLE 1

Peas which have been previously washed and sorted (from 8.5 to 11 millimeters in diameter) are blanched for 1 minute in a continuous screw-steam blanching apparatus, and 0.27 kg of condensate per kg of peas is recovered. The peas are immediately cooled from a temperature of 90°–100° C. to a temperature of 20°–22° C. in a fluidized bed by means of a current of 5,000 kg/h of outside air, at a temperature of 17° C.

The condensate, containing 3% of dry matter, is passed through a sieve having meshes of 0.1 mm and is concentrated to 18% of dry matter in a centrifugal evaporator.

After cooling in air, the salt content of the peas is adjusted by passing them for 15 seconds through a trough in which brine is circulating (11% of sodium chloride). After separating the peas from the brine which is recycled, they are cooled to a temperature approaching 0° C. in a trough which is in line with the brining trough and through which they are advanced during 60 seconds by continuous screw, with cooling water which circulates in counter-current simultaneously removing excess salt. At the outlet, the water is cooled in a heat exchanger and is recycled to the inlet.

The peas are then frozen to a temperature of −15° C. in a fluidized bed and their surfaces are then glazed by spraying the above-mentioned concentrated condensate through a nozzle having an opening of 0.9 mm, located at the centre of a horizontal rotating drum containing the product, which is thus evenly glazed with 4 to 5% of condensate based on the weight of the frozen peas.

EXAMPLE 2

Washed and sorted peas (from 8.5 to 11 mm) are blanched in a steam belt-blanching machine and are cooled by air in a fluidized bed and are sprayed with an aqueous medium. 0.21 kg of condensate per kg of peas are recovered which are then passed through a vibrating sieve having meshes of 0.55 mm. The salt content is adjusted as in Example 1. The peas are frozen and their surfaces are then glazed by spraying some of the condensate into a horizontal rotating drum from a nozzle having an opening of 0.7 mm located at its centre, at a rate of 0.05 kg of condensate per kg of peas. 0.10 kg of the same condensate per kg of peas is used in the above-mentioned air-cooling stage in order to replace the water which has evaporated from the surface of the peas, while the remainder of the condensate is removed by sending it to a treatment plant.

EXAMPLE 3

It is possible to illustrate the ecological advantages of the process according to the present invention by comparing it to conventional water-blanching and water-cooling operations and by observing their respective biological oxygen demand (BOD).

It is organic matter, in solution or in very fine suspension, which causes most of the pollution problems. The organic matter content of a waste water, in solution or in suspension, is determined by measuring the oxygen consumption which accompanies its oxidative decomposition by microorganisms for which it is a substrate. This content is expressed in mg of BOD/liter. The $BOD_7$ is determined by diluting a known proportion of the residual water with water which is free of organic matter and is saturated with oxygen, incubating it for 7 days at 20° C. with its own microbial load and measuring the residual oxygen in order to determine the quantity of oxygen which has been consumed. A series of tests is carried out with different dilutions, and the test in which the oxygen which has been consumed corresponds to about half the available oxygen before incubation is retained, and tests in which dilution water alone is used are taken as the control. The content of dissolved oxygen is established by volumetric determination and the quantity in mg of oxygen which is consumed, based on one liter of waste water, is the $BOD_7$.

As a reference, the values of the yield and of the $BOD_7$ of a conventional process were determined, the process comprising the same paring and washing stages as the processes according to Examples 1 and 2, followed by water-blanching, cooling by passing the peas through a water trough, brining, adjusting the salt content by a second cooling in which the peas are passed through a water trough, and then freezing the peas without glazing them.

The following results were obtained:

|  | Conventional process | Process according to Example 1 | Process according to Example 2 |
| --- | --- | --- | --- |
| Total $BOD_7$, (including washing, blanching, cooling and adjusting the salt content) in mg/l | 27,000 | 17,000 | 18,800 |
| Yield in % by weight of washed and sorted starting material | 89.1 | 94.2 | 92.1 |

Compared to the conventional process, the process according to the present invention provides a marked improvement in terms of nutritional value, yield and reduction of water polution.

We claim:

1. A process for the preparation of frozen fruit or vegetables, in which the volume of waste waters is reduced, comprising blanching the fruit or vegetables in an atmosphere containing steam, recovering condensate produced during said blanching, cooling the blanched fruit or vegetables in an essentially gaseous medium, freezing the cooled fruit or vegetables and glazing the frozen fruit or vegetables by contacting the frozen fruit or vegetables with at least some of the condensate produced during blanching.

2. A process according to claim 1 wherein coarse particles are removed from the condensate, at least some of the condensate is concentrated and the concentrated condensate is used for glazing the frozen fruit or vegetables.

3. A process according to claim 2 wherein some of the condensate is sprayed over the product during the cooling stage.

4. A process according to claim 2 wherein all of the condensate is concentrated to the exact volume required for glazing.

5. A process according to claim 2 wherein the condensate which has been freed from coarse particles is treated with ion-exchange resin in order to remove undesirable soluble substances.

6. A process according to claim 1 further comprising transferring the cooled fruit or vegetables into an aqueous medium, further cooling the fruit or vegetables in the aqueous medium, and recycling the aqueous medium through a heat-exchanger.

7. A process according to claim 1 further comprising spraying onto the fruits or vegetables during the cooling step an aqueous medium, and further recycling the aqueous medium through a heat-exchanger.

8. A process according to one of claims 1 to 7 for the treatment of vegetables wherein after the vegetables have been cooled, the salt content thereof is adjusted by passing the cooled vegetables into a brine, separating the cooled vegetables from the brine, recycling the brine, washing the vegetables and recycling the washing water through a heat-exchanger.

* * * * *